May 16, 1967 M. FEINBERG 3,319,467
THERMOSTATIC DEVICE
Filed Oct. 4, 1963 2 Sheets-Sheet 1
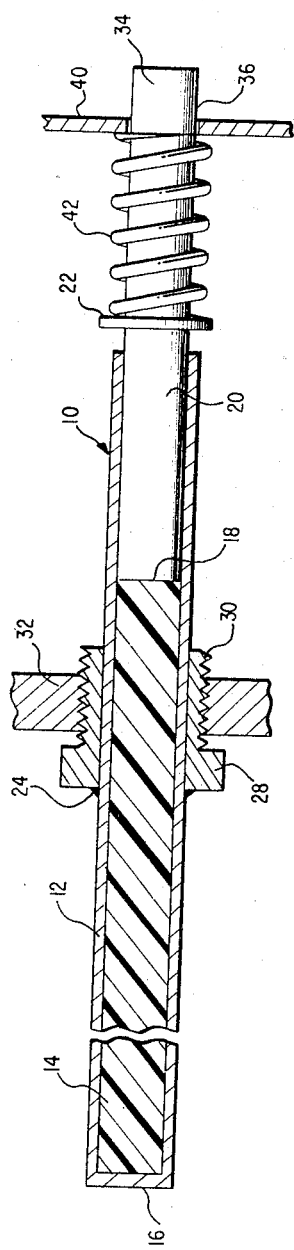
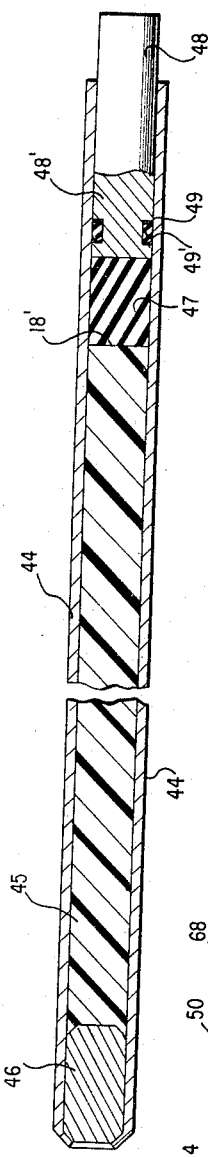
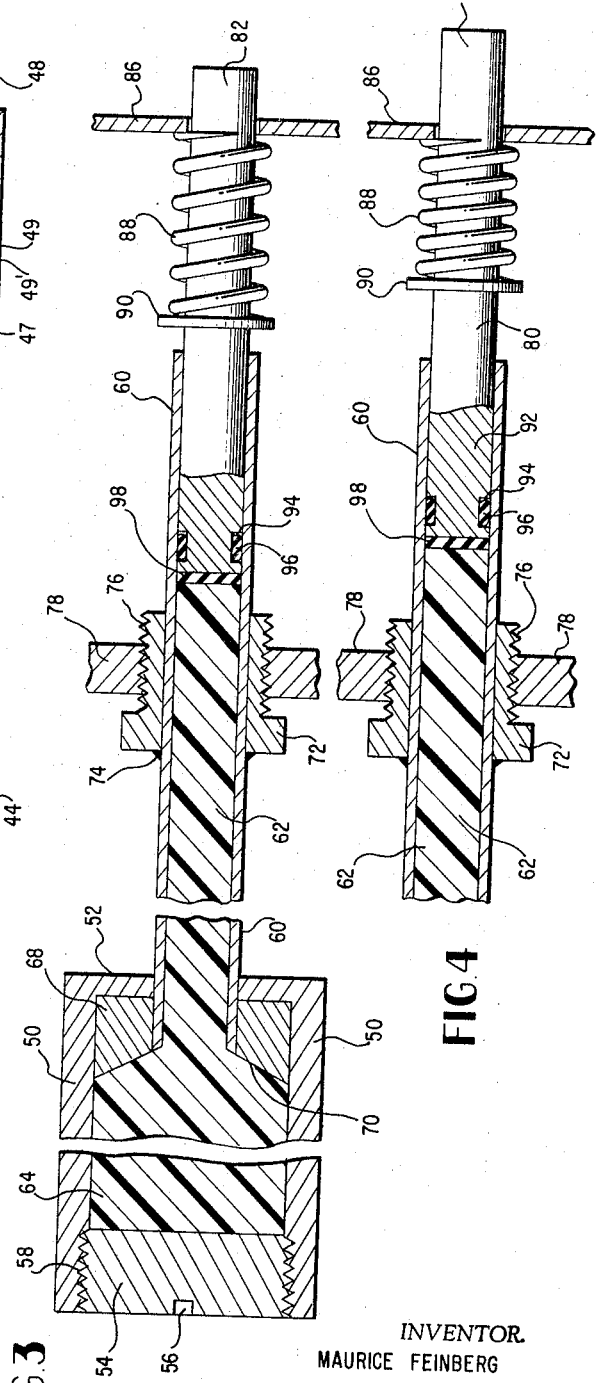
INVENTOR.
MAURICE FEINBERG
BY
*Bartholomew Wiggins*
ATTORNEY May 16, 1967 M. FEINBERG 3,319,467
THERMOSTATIC DEVICE
Filed Oct. 4, 1963 2 Sheets-Sheet 2
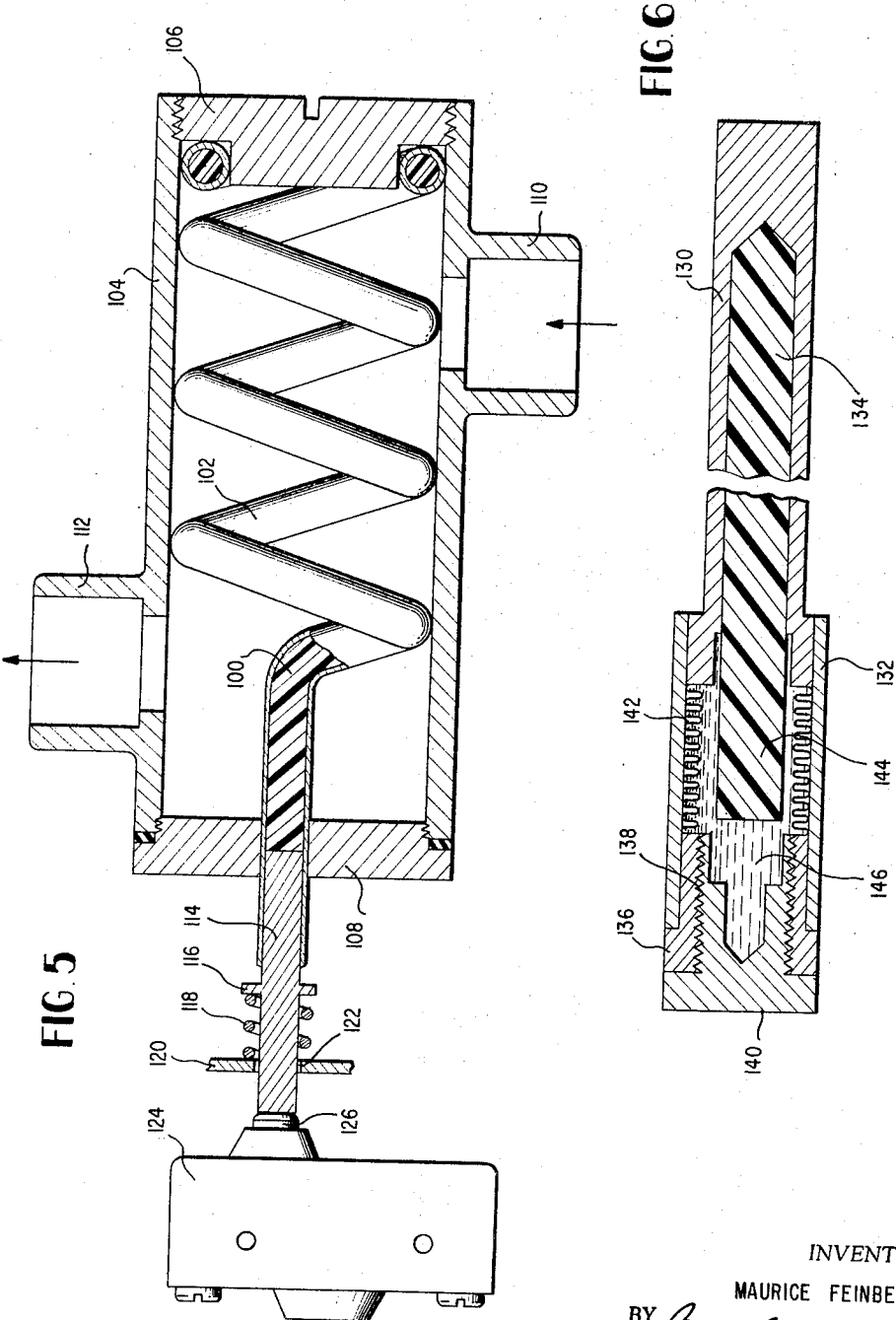
INVENTOR.
MAURICE FEINBERG
BY Bartholomew Diggins
ATTORNEY United States Patent Office 3,319,467
Patented May 16, 1967

3,319,467
THERMOSTATIC DEVICE
Maurice Feinberg, 2 Jackson St.,
Waltham, Mass. 02154
Filed Oct. 4, 1963, Ser. No. 313,885
3 Claims. (Cl. 73—362.3)

This invention relates to thermosensitive control devices and more particularly to a thermosensitive actuator incorporating an expandable heat sensitive plastic.

Heat responsive actuating devices of various types using expandable materials are well known, the most common of such devices being the bellows-type utilizing liquids such as wax, oil, water and the like, enclosed within a tube or housing having a flexible diaphragm at one end thereof. Other similar devices utilize various wax compositions either alone or in combination with powdered metallic particles.

In accordance with the present invention there is provided a novel, improved heat responsive actuator incorporating as the active element an expandable rod of plastic material. In the preferred embodiment, the driving element is in the form of a polyethylene plastic which material is particularly well adapted for use as the active element since it remains essentially a solid during the operating range of the actuator, and accordingly, the need for sealing elements incident to the use of a liquid as the driving element is eliminated.

The novel actuator of the present invention does not evidence fatigue distress common to the rubber of rubber-like bellows and diaphragm devices, and additionally, it is capable of driving with a far greater force and of moving over a greater distance than previously known actuators. Since the only moving part is constituted by a sliding plastic rod and a piston within a tube the actuator may be simply and economically constructed. The plastic is not subject to aging nor to adverse environment conditions since it is at all times enclosed within a tube and any moisture which may be originally contained in the tube is forced or squeezed out upon initial actuation of the device.

An object of the present invention is to provide an improved thermosensitive actuator.

Another object of the present invention is to provide an actuator incorporating a thermosensitive plastic as the expandable drive element.

Yet another object of the present invention is to provide an improved heat sensitive actuator incorporating a polyethylene plastic as the expandable drive element.

Still another object of the present invention is to provide an improved heat-sensitive actuator incorporating a polyethylene rod as the expandable drive element.

A further object of the invention is to provide an improved heat-sensitive actuator employing a polyethylene plastic as the expandable drive element, which element remains essentially a solid within the operating range of the actuator.

Yet a further object of the invention is to provide an improved actuator designed for use with installations of the type wherein the actuator is immersed in a liquid, or exposed to a liquid environment, said actuator incorporating an expandable, heat sensitive plastic as the drive element and having improved sealing means constructed and arranged to prevent ingress of liquid and thereby eliminate operation deviation of inaccuracy caused thereby.

A still further object of the invention is to provide an improved heat sensitive actuator incorporating polyethylene plastic as the expandable drive element, said actuator being strong and sturdy in construction, consisting of but relatively few parts, and not liable to get out of order even after long and continued use.

With these and other objects in view, which may be incident to my improvements, the invention consists in the parts and combinations to be hereinafter set forth and claimed, with the understanding that the several necessary elements comprising my invention, may be varied in construction, proportions and arrangements, without departing from the spirit and scope of the appended claims.

In order to make my invention more clearly understood, I have shown in the accompanying drawings means for carrying the same into practical effect, without limiting the improvements in their useful application to the particular constructions, which for the puspose of explanation, have been made the subject of illustration.

In the drawings:

FIGURE 1 shows one embodiment of the actuator of the present invention;

FIG. 2 shows a modified form of the actuator of the present invention;

FIG. 3 shows a further modification of the actuator of the present invention;

FIG. 4 illustrates the position of the actuator of FIG. 3 at elevated temperatures;

FIG. 5 shows another modification of the actuator of the present invention; and

FIG. 6 shows still another modification of the actuator of the present invention.

Referring to the drawings, and more particularly to FIG. 1, the novel actuator of the present invention, indicated generally by numeral 10, comprises a tube or casing 12 formed from a suitable material adapted to house a plastic rod 14 snugly received therein. One end of the casing may be closed by an integral cap 16 or by other suitable closure means, with one end of the plastic rod engaging the end cap, and the opposite end 18 of the rod engaging the adjacent end of a push rod 20 slidably supported within the open end portion of the casing 12. The push rod 20 is provided with an annular flange 22 which acts as a stop and limits movement of the rod inwardly of the casing.

Secured to the outer surface of the casing 12, as by welding 24, is an adjusting screw 28 having threads 30 adapted for threaded engagement with support panel 32 for the actuator. By rotating the screw 28 the actuator may be advanced or retracted with respect to the panel 32, and thereby change the zero setting thereof. While adjusting means are shown for varying the setting of the actuator, it will be understood, that if desired, the actuator may be pre-set, thus eliminating the adjusting means.

The outer end portion 34 of the push rod 20 passes through an aperture 36 in spring retainer 40 which may constitute a portion of a suitable housing for the actuator and may be physically connected to support panel 32. A suitable compressing spring 42 is interposed between the retainer 40 and the annular flange 22 of the push rod 20, whereby the push rod is biased against the plastic rod 14 during expansion and contraction thereof.

When the actuator 10 of FIG. 1 is subjected to increased temperatures the plastic rod 14 expands, thus moving the push rod 20 to the right, as viewed in FIGURE 1, so that the end portion 34 of the rod extends further beyond member 40, in order to actuate a switch, operate a valve, or perform some other useful drive function. The polyethylene rod employed as the drive element becomes plastic at approximately 194° F. and has a useful range of from 100°–300° F. The rod remains extremely viscous and essentially a solid within the operating range, and does not leak out between the piston or push rod 20 and the inner wall of the casing 12. In one embodiment of an actuator constructed in accordance with FIG. 1, a 10-inch rod of polyethylene received in a 12-inch long casing expanded upon heating to a length of 12 inches. The polyethylene rod was ³⁄₁₆″ in diameter and had a minimum opposing spring force of 20 ft.-pounds.

The actuator arrangement of FIGURE 1 is designed for use in connection with "dry" installations, that is to say, installations of the character wherein the actuator is not immersed in a liquid or otherwise exposed to a liquid environment. It will be appreciated that in many installations the actuators are immersed in a fluid which may be under pressure, and accordingly, means must be provided to assure their accurate and efficient operation when used with so-called "wet" installations.

Concerning the need for means to assure accurate operation of an actuator when immersed in a liquid, and particularly in a liquid under pressure, it has been found that an actuator constructed in accordance with FIG. 1, for example, when used with a "wet" installation is subject to deviation and inaccuracy caused by the ingress of liquid between the inner wall of the housing 12 (FIG. 1) and the outer surface of the polyethylene rod 14, which liquid travels inwardly from the open end 12′ of the housing into contact with the end 14′ of the rod, due to a combination of forces. One of the forces is the positive pressure of the liquid which drives it inwardly of the tube, and another is the result of the negative pressure developed between the end cap 16 and the inner end 14′ of the rod, when the rod expands.

After considerable research and experimentation I have found that deviation and inaccuracy in the operation of the actuator when used with so-called "wet" installations, as explained hereinabove, can be eliminated by utilizing the reactive components of the forces developed by the plastic rod and the piston or push rod, to radially expand a sealing member into tight sealing engagement with the inner surface of the actuator housing. In this connection, it will be appreciated that the magnitude of the forces exerted on the sealing member is a function of the resistance to movement of the piston, and accordingly, the sealing effect of the sealing member is directly proportional to the movement or thrust of the piston.

I have also found, that under certain conditions of use, depending upon the nature of the fluid environment in which the actuator is submerged, there is a tendency for foreign material carried by the liquid, for example, relatively fine particles of lime, sand, metallic dust or other particulate material, to travel inwardly of the actuator housing between the piston and the inner surface of the housing into contact with the sealing member and eventually into contact with the plastic rod, thus causing scoring of the housing, and abrasion of the piston and the sealing member. The combined effect of the abrasion and scoring of the aforementioned components is manifested by a gradual deterioration of the sealing function of the sealing member, whereby operational deviation and inaccuracy occur, by reason of ingress of the liquid into the housing and in contact with the plastic rod.

Referring to FIG. 2, there is shown a modified embodiment of the actuator of the present invention designed for use with "wet" installations, that is to say, installations of the type wherein the actuator is submerged in a liquid or exposed to a liquid environment which may be under pressure. In this embodiment of the invention the actuator comprises a rigid casing or tube 44 formed from hard copper, Monel metal, stainless steel or other suitable material adapted to house an expandable, heat sensitive plastic rod 45. One end of the casing may be closed by means of a sealing plug 46 formed from brass or other suitable material, the plastic rod having one end engaging the plug, the opposite end 18′ of the rod engaging the adjacent end of a sealing member 47 formed from silicone rubber, Viton, or other elastomeric material, interposed between the outer end of the plastic rod and the inner end of a piston or push rod 48. It will be understood that the sealing member may be formed from any suitable natural or synthetic elastomeric material such a natural rubber, butadiene-styrene copolymers, polyisobutylene, chloroprene, copolymer blends of styrene-acrylonitrile and butadiene-acrylonitrile, which materials may be employed as replacement elastomers for the silicone rubber.

The end portion 48′ of the piston or push rod 48 (FIG. 2) is formed with an annular groove 49 having a resilient O-ring 49′ seated therein, said ring providing a tight seal between the piston and the housing, whereby to prevent foreign material such as oil, particles of sand, metallic dust, or other particulate material from coming into contact with the sealing plug and/or the plastic rod. The driving element 45 of the actuator is preferably formed from polyethlene, however, it will be appreciated that other expandable, heat sensitive plastics, for example, various combinations of polyethylene and suitable waxes may be employed.

In the embodiment of FIG. 2, assuming that the actuator is operatively associated with a use device, for example, a valve, electrical switch, or other mechanism, and is subjected to elevated temperatures, the plastic rod 45 expands, thus moving the piston 48 to the right as viewed in FIG. 2, to actuate the valve, operate the switch, or perform some other useful drive function. As the piston moves outwardly against the resistance of the operative component of the device with which the actuator is associated, the sealing member is radially expanded into tight sealing engagement with the inner surface of tthe tube, due to the compressive action of the forces developed between the outer end 18′ of the plastic rod, and the inner end of the piston.

This improved sealing arrangement is an important feature of the present invention, since it provides a positive seal against ingress of liquid into the tube and into contact with the plastic rod in the event that the actuator is immersed in a liquid or subjected to a liquid environment which may be under pressure.

Referring to FIG. 3 there is shown another embodiment of the actuator of the present invention comprising a cylindrical shaped housing 50 having an apertured end wall 52, and a plug 54 threadably received in its opposite end, which plug is preferably keyed as at 56 to provide for adjustment within the threaded portion 58 of the housing. Extending through the apertured end wall 52 of the housing is a rigid tubular casing 60 formed from hand copper or other suitable material which casing, in conjunction with the housing 50, completely surrounds a heat sensitive expandable plastic rod 62 comprising an enlarged end portion 64 within the housing 50, and a portion 66 of reduced diameter snugly received in the casing 60. An annular adapter 68, positioned within the housing is secured to the housing and to the casing by brazing or other suitable means. The rear surface 70 of the adapter 68 is preferably inclined at an angle of approximately 60° with respect to the longitudinal axis of the plastic rod, for utilizing capillary attraction to achieve a greater movement of the plastic along the casing and thereby move the piston a greater distance.

Secured to the casing 60, as by welding 74, is an adjusting screw 72 having threads 76 adapter for threaded engagement with a fixed support 78 for the actuator. By rotating the screw the actuator may be advanced or retracted with respect to the support, and thereby vary its zero setting. The end porion 82 of the push rod 80 extends through an aperture 84 in a member 86 which member may, in conjunction with the support 78, constitute a housing or framework to support the actuator in operative position with respect to the use device with which it is associated. A suitable compression spring 88 surrounding the outer end portion of the push rod 80 has one end abutting the member 86, the opposite end of the spring bearing against a stop member 90 carried by the push rod, whereby the push rod is biased in the direction of the plastic rod whereby to return the same it its initial unexpanded condition, and to effect tight sealing engagement between suitable sealing means and the interior of casing 60, as will be described more fully hereinafter.

Reference again being made to FIG. 3, it will be noted that the left end 92 of the push rod is formed with an annular groove 94 to receive a resilient O-ring seal 96 to seal the push rod against the casing 60. The O-ring may be formed from Buna-N-rubber or from silicone rubber, or other suitable elastomeric material, said O-ring functioning to exclude foreign materials such as dirt, dust particles, oil and other particulate material from coming into contact with the plastic rod. A compressible disk or plug 98 of silicone rubber or other suitable material is interposed between the outer end of the plastic rod and the inner end of the push rod, as shown, the disk being radially expanded into tight sealing engagement with the interior of the housing 60 due to the compressive action of the forces between the end of the plastic rod and the end of the piston, as explained in connection with the description of the embodiment of the actuator shown in FIG. 2. The primary function of the sealing member is to prevent foreign material from entering the casing and coming into contact with the plastic rod, and accordingly, it should be of such dimensions to radially expand into tight sealing engagement with the interior of the housing.

Referring to FIG. 4, the actuator of FIG. 3 is shown with the plastic rod in expanded position. As will be seen, when the rod is subjected to elevated temperatures it expands along the casing 60 and forces the piston or push rod 80 a substantial distance to the right so that the end portion 82 thereof projects a greater distance through the aperture 84, which movement compresses the spring and increases its restoring force.

In order to insure uniform operation of the actuator, that is to say, insure that actuation of the device always occurs at the temperature for which it is pre-set, it has been found necessary to provide means for returning the plastic rod, upon cooling, to its normal unexpanded condition. The need for such return means is due to the fact that the plastic does not consistently contrast to the position it occupied before being heated, and therefore the next actuation of the device does not occur at precisely the same temperature as the previous one.

When using the actuator arrangement of FIG. 2 with use devices such as valves for controlling the flow of liquids, which valves are biased into normally open or normally closed position, the biasing means may be utilized to return the plastic rod to its initial unexpanded condition. In the event that the use device does not incorporate means for biasing one of its components into a selected, desired position, a return spring or other biasing means, not shown, may be employed.

It will be noted that the biasing means for returning the plastic rod to its initial unexpanded condition performs two functions; it not only returns the rod to its initial condition, but also maintains the sealing member interposed between the rod and the piston in sealing contact with the interior actuator casing or housing at all times thereby preventing ingress of foreign materials interiorly of the housing and into contact with the plastic.

Referring to FIG. 5 there is shown a further embodiment of the present invention wherein the plastic rod 100 is in the form of a helix and is received within a similar helical casing or tube 102. The tube and rod are both secured within a cylindical housing 104 closed at its rear end by a threaded plug or sealing cap 106 which contacts the inner end of the helical rod 100 and which may be threaded into or out from the housing 104 to vary the zero setting of the control unit. The housing is closed at its opposite end by a second sealing cap and the tube connection 108. Cap 108 is centrally apertured to permit casing 102 to pass therethrough. Housing 104 is provided with an inlet 110 and an outlet 112 for the passage of water, air, or other fluid medium, the temperature of which control the operation of the actuator.

Abutting end end of plastic rod 100 is a piston or push rod 114 provided with integral flange 116 which bears against one end of helical compression spring 118. A spring retainer plate 120 bears against the opposite end of spring 118 and is provided with a central aperture 122 through which push rod 114 passes. Retainer plate 120 may be connected to and supported by housing 104 in any suitable manner. A microswitch 124 is provided with an actuating button 126 adjacent the end of push rod 114 so that expansion of the plastic rod 100 drives the push rod 114 against button 126 to actuate switch 124. As in the prior embodiments, compression spring 118 acts against flange 116 to return the push rod and plastic rod to its zero setting when the temperature returns to its initial value.

FIG. 6 shows a further embodiment wherein the actuator is provided with a bellows seal. In FIG. 6 the push rod 130 is slidable within a cylindrical bellows guide 132. Received within the hollow push rod 130 is an expansible plastic rod 134. Bellows guide 132 is secured to a sealing member 136 internally threaded as at 138 to receive an end cap 140.

Secured at one end to the adjacent end of push rod 130 is a bellows 142 having its opposite end secured to the sealing member 138. Movement of the push rod 130 with respect to bellows guide 132 causes the bellows 142 to expand and contract in accordance with this movement. The area defined by the end of push rod 130, the bellows 142, sealing element 136, and cap 140, all surrounding the end 144 of plastic rod 134 is filled with a fluid 146. The fluid 146 may be water, silicone oil or other suitable liquid or gas and is used primarily as a secondary fill to prevent the plastic rod 134 from extruding into the convolutions of bellows 142.

In the embodiment of FIG. 6, increases in temperature cause the plastic rod 134 to expand against the fluid at one end and against the push rod 130 at the opposite end, thus driving the push rod 130 to the right to actuate a switch, close a valve or perform some other useful function. As in the prior embodiments, a suitable spring arrangement (not shown) may be provided to return the push rod to its original position when the actuator has cooled to its initial temperature.

It is apparent from the above that the present invention provides a novel thermosensitive actuator substantially improving over known devices in terms of high accuracy, reliability, the generation of a powerful positioning force, and simplicity of construction. The expandable actuator of the present invention generates a greater force and moves a substantially greater distance than conventional devices. The plastic is not subject to aging or adverse environmental effects since it is enclosed in a tube and moisture may not gain access to it.

If desired, the plastic rod in any of the embodiments may be coated with a suitable lubricant such as silicone grease to facilitate the sliding movement of the plastic within the tube and to speed the contraction of the plastic when cooling.

The plastic selected for use in the present invention must have a high coefficient of expansion with corresponding low density relative to metallic solids within the desired range of temperature. Furthermore, the material must remain essentially an expandable solid throughout the same temperature range. The term solid is used broadly since some polyethylenes can have viscosities in the range of 4,000 cps. (centepoise), well above the theoretical melting point of the particular polyethylene or the point at which the crystal lattice breaks down, and yet still be effective for the present invention.

The actuator of the present invention containing polyethylene has been found especially suitable since it contains a built-in safety feature protecting the device against adverse effects caused by temperature conditions higher than its intended temperature range. This built-in safety feature results from the fact that the expansion is dependent upon the load. Thus if the surrounding tube or casing is subjected to unusually high temperatures, the piston or push rod will travel to its stop and closing force will overcome the force of expansion of the plastic so that it will turn to a liquid without further expansion. It is understood, however, that this limiting of the expansion of the polyethylene occurs only with extremely high opposing forces well above the normal operating forces involved in conjunction with the use of the actuator.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. In a fluid conducting device including a fluid housing having a fluid inlet port and a fluid outlet port communicating with the interior of said fluid housing, a thermosensitive control device mounted within the interior of said fluid housing so as to be responsive to the temperature of fluid in said fluid housing, said thermosensitive control device comprising a substantially rigid casing closed at one end and open at the other end, said casing being mounted within said housing to directly contact fluid flowing inwardly through said inlet port, a thermally sensitive, inelastic plastic member expandable at elevated temperatures received within said casing and abutting said closed end, said plastic member and casing being in the form of a helix, with said casing including a straight section extending from the convolutions of said helix to the open end of said casing, and drive means received within the open end of said casing and extending into said straight section thereof, said drive means movable outwardly of the open end of said casing in response to expansion of said plastic member at elevated temperatures.

2. In a fluid-conducting device including a fluid housing and a fluid inlet port and a fluid outlet port communicating with the interior of said fluid housing, a thermosensitive control device mounted within the interior of said fluid housing comprising a rigid, substantially tubular casing closed at one end and open at the other end, a thermally sensitive, inelastic plastic member expandable at elevated temperatures received within said tubular casing and abutting said closed end, said plastic member and tubular casing being in the form of a helix, the outside surface of the convolutions of said helix being in contact with the walls of said fluid housing, said tubular casing adjacent the open end thereof including a straight section substantially axially aligned with a line passing longitudinally through the center of the convolutions of said helix, drive means received within the open end of said tubular casing and extending into said straight section thereof, said drive means being movable outwardly of the open end of the tubular casing in response to expansion of said plastic member at elevated temperatures, and biasing means mounted upon said drive means, said biasing means being operative to bias said drive means toward said plastic member.

3. In a fluid-conducting device including a fluid housing having a fluid inlet port and a fluid outlet port communicating with the interior of said housing, a thermosensitive control device mounted within the fluid housing in contact with fluid flowing between said inlet and outlet ports, said thermosensitive control device comprising a rigid substantially tubular casing closed at one end and open at the other end, a thermally sensitive inelastic plastic means expandable at elevated temperatures received within said tubular casing and abutting said closed end thereof, said plastic means being expandable as essentially a solid at temperatures below 300° F. and, with said casing, being in the form of a helix, the outside surface of the convolutions of said helix being in contact with the walls of said fluid housing, said tubular casing adjacent the open end thereof including an elongated straight section being substantially axially aligned with a line passing longitudinally through the center of the convolutions of said helix, drive means received within the open end of said tubular housing and extending into said straight section, said drive means being movable outwardly of the open end of said housing in response to expansion of said plastic means at elevated temperatures, biasing means mounted upon said drive means, said biasing means being operative to bias said drive means toward said plastic means to cause contraction of said plastic means from an expanded position upon a drop in fluid temperature in said fluid housing, and support means connected to said casing said control device in operative position within said fluid housing.

References Cited by the Examiner

UNITED STATES PATENTS

| | | | |
|---|---|---|---|
| 260,148 | 6/1882 | Allen | 73—363 X |
| 578,297 | 3/1897 | Sharpneck | 73—363.9 X |
| 1,371,277 | 3/1921 | Udale | 73—362.3 |
| 1,890,909 | 12/1932 | Lincoln | 73—368.3 X |
| 2,246,690 | 6/1941 | Leonard | 73—362 |
| 2,548,941 | 4/1951 | Brown | 73—363 |
| 2,835,634 | 7/1958 | Vernett | 73—368.3 |
| 2,841,983 | 7/1958 | Vernett | 78—358 |
| 2,924,083 | 2/1960 | Spase | 73—363 X |
| 3,007,029 | 10/1961 | Levine | 73—368.3 |
| 3,016,691 | 1/1962 | Asadawa | 73—368.3 |

FOREIGN PATENTS

| | | |
|---|---|---|
| 814,762 | 9/1951 | Germany. |
| 531,280 | 1/1940 | Great Britain. |

LOUIS R. PRINCE, *Primary Examiner.*

ISAAC LISANN, *Examiner.*

J. H. BARKSDALE, J. RENJILIAN, W. A. HENRY, *Assistant Examiners.*